US011880439B2

(12) United States Patent
Levi et al.

(10) Patent No.: US 11,880,439 B2
(45) Date of Patent: Jan. 23, 2024

(54) ENHANCING VERIFICATION IN MOBILE DEVICES USING MODEL BASED ON USER INTERACTION HISTORY (71) Applicant: International Business Machines Corporation, Armonk, NY (US)

(72) Inventors: Matan Levi, Tel Aviv (IL); Itay Hazan, Be'er Sheva (IL)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 17/304,184

(22) Filed: Jun. 16, 2021

(65) Prior Publication Data
US 2022/0405358 A1   Dec. 22, 2022

(51) Int. Cl.
*G06F 21/31* (2013.01)
*G06F 16/28* (2019.01)

(52) U.S. Cl.
CPC .......... *G06F 21/316* (2013.01); *G06F 16/285* (2019.01)

(58) Field of Classification Search
CPC ...... G06F 21/316; G06F 21/44; G06F 21/445; G06F 21/50; G06F 16/285
See application file for complete search history.

(56) References Cited

U.S. PATENT DOCUMENTS

| | | | |
|---|---|---|---|
| 8,171,298 B2 | 5/2012 | Ramaswamy | |
| 8,656,469 B2 | 2/2014 | Ramaswamy | |
| 9,087,104 B2 * | 7/2015 | Graham | ................ G06F 16/955 |
| 9,185,095 B1 | 11/2015 | Moritz | |
| 9,369,476 B2 * | 6/2016 | Chekina | .............. H04L 63/1425 |
| 9,400,879 B2 | 7/2016 | Tredoux | |
| 9,495,385 B2 * | 11/2016 | Moraleda | ............... G06V 10/94 |

(Continued)

FOREIGN PATENT DOCUMENTS

| | | |
|---|---|---|
| CN | 111163057 A | 5/2020 |
| TW | 233288 B | 5/2005 |

(Continued)

OTHER PUBLICATIONS

Mell, et al., "The NIST Definition of Cloud Computing", National Institute of Standards and Technology, Special Publication 800-145, Sep. 2011, 7 pages.

(Continued)

*Primary Examiner* — Hosuk Song
(74) *Attorney, Agent, or Firm* — Michael A. Petrocelli (57) ABSTRACT

User verification using a mobile interaction can include receiving interaction data associated with a user of an application operating on a mobile device, the interaction data is generated during an interactive session of the user with the application on the mobile device. A plurality of features are extracted from the interaction data and one or more feature vectors are generated from the plurality of features. The plurality of features are aggregated to the one or more feature vectors and embedded within each feature vector. The embedded plurality of features are then projected to a global feature space by comparing a history of interactive sessions associated with the user and a history of interactive sessions associated with a plurality of different users for generating a global training dataset. Finally, a verification model is generated as a global binary classification model using the global training dataset.

20 Claims, 7 Drawing Sheets

(56) References Cited

U.S. PATENT DOCUMENTS

| | | |
|---|---|---|
| 9,516,035 B1 | 12/2016 | Moritz |
| 9,646,296 B2* | 5/2017 | Brown ................ H04L 63/0838 |
| 9,870,388 B2* | 1/2018 | Erol .................... G06V 10/993 |
| 9,961,547 B1 | 5/2018 | Molina-Markham |
| 10,007,928 B2* | 6/2018 | Graham ................ G06F 18/254 |
| 10,749,864 B2* | 8/2020 | Garcia Gomar ........ G10L 17/22 |
| 11,545,155 B2* | 1/2023 | Gomar .................... G10L 17/00 |
| 2004/0088587 A1 | 5/2004 | Ramaswamy |
| 2008/0005788 A1 | 1/2008 | Ramaswamy |
| 2012/0054057 A1 | 3/2012 | O'Connell |
| 2012/0131658 A1 | 5/2012 | Ramaswamy |
| 2012/0204257 A1 | 8/2012 | O'Connell |
| 2014/0300554 A1 | 10/2014 | Samuel |
| 2015/0358317 A1 | 12/2015 | Deutschmann |
| 2016/0063393 A1 | 3/2016 | Ramage |
| 2019/0364027 A1 | 11/2019 | Pande |
| 2020/0134148 A1 | 4/2020 | Mortazavian |
| 2020/0401382 A1 | 12/2020 | Briggs |
| 2021/0073261 A1 | 3/2021 | Sander-Edwards |

FOREIGN PATENT DOCUMENTS

| | | |
|---|---|---|
| TW | 792923 B | 2/2023 |
| WO | 2015088537 A1 | 6/2015 |
| WO | 2015179428 A1 | 11/2015 |
| WO | 2016157075 A1 | 10/2016 |
| WO | 2019190619 A1 | 10/2019 |
| WO | 2022263977 A1 | 12/2022 |

OTHER PUBLICATIONS

International Searching Authority, "Notification of International Search Report and Written Opinion or Declaration", International Application No. PCT/IB2022/055365, dated Sep. 26, 2022, 7 pages.
Levi, et al., "Enhancing Verification in Mobile Devices Using Model Based on User Interaction History", International Application No. PCT/IB2022/055365, International Filing Date Jun. 9, 2022, 36 pages.

* cited by examiner

ENHANCING VERIFICATION IN MOBILE DEVICES USING MODEL BASED ON USER INTERACTION HISTORY

BACKGROUND

The present invention generally relates to the field of cyber security, and more particularly to user verification in mobile devices.

Most of today's sensitive systems, such as bank accounts and social media accounts, can be accessed through mobile devices. Authentication schemes typically used by sensitive systems include, for example, passwords (with or without second factor authentication), fingerprints, and one-time passwords. Currently, these methods still cannot efficiently prevent credentials theft. Additionally, authenticated sessions can be hijacked through stolen cookies, man in the middle (MitM) attacks, social engineering and more. Moreover, once the user is authenticated, most authentication mechanisms fail to continuously authenticate the user's identity throughout the session, which may not prevent attacks from happening after the first authentication. User verification systems based on mobile interaction may allow to verify the identity of users throughout the sessions and may prevent credential theft.

SUMMARY

The present disclosure recognizes the shortcomings and problems associated with user verification in mobile devices. Particularly, the problems associated with current user verification schemes that require building one model for each user in the system which can cause memory overload and generate problems related to debugging, updating and analyzing many different verification models in parallel. Therefore, embodiments of the present disclosure provide a method and system for user verification in mobile devices that does not require building one model for each user. This is achieved by using an embedding system that can be implemented in mobile behavioral verification methods with the advantages of a single model for all users approach.

Shortcomings of the prior art are overcome and additional advantages are provided through the provision of a computer-implemented method for user verification in mobile devices. The method includes receiving, by one or more processors, interaction data associated with a user of an application operating on a mobile device, the interaction data being generated during an interactive session of the user with the application on the mobile device, extracting, by the one or more processors, a plurality of features from the interaction data, generating, by the one or more processors, one or more features, aggregating, by the one or more processors, the plurality of features to the one or more feature vectors, embedding, by the one or more processors, the plurality of features within each feature vector and projecting the embedded plurality of features to a global feature space by comparing a history of interactive sessions associated with the user and a history of interactive sessions associated with a plurality of different users for generating a global training dataset, and generating, by the one or more processors, a verification model as a global binary classification model using the global training dataset.

Another embodiment of the present disclosure provides a computer program product for user verification in mobile devices, based on the method described above.

Another embodiment of the present disclosure provides a computer system for user verification in mobile devices, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In one example, an interaction history, such as behavioral biometrics provide a way to verify or profile users while they interact with electronic systems. In particular, behavioral biometrics can help continuously verify a user's identity during sessions with applications operating in a mobile device, based on interaction patterns of the user with the mobile device. Most behavioral biometrics techniques for mobile devices build a model for each user based on data obtained from different sensors available in the mobile device, for example, touch screen interaction sensors, motion sensors, etc. From this data meaningful features can be extracted to learn and model user's behavior. Exemplary features include average velocity, maximum acceleration, total movement distance, and/or pressure standard deviation. These features are then used to generate a model for each user to model his/her particular patterns. However, implementing personalized behavioral biometrics models in large real-time systems can cause excessive memory consumption, processing utilization and cause storage and run-time delays.

Previous global models can be used in behavioral biometrics to, for example, differentiate between a human and bots, but not for user verification. Global models has many advantages, and it would be desirable to train a global model to continuously verify specific users based on data from a plurality of different users. By doing this verification systems based on behavioral biometrics can take advantage of a model that has bounded memory consumption and storage.

However, behavioral data for user verification varies significantly from one user to another. Hence, using a global verification model that fits behavioral data from a large number of different users may ignore important individual characteristics associated with a specific user's behavior. It should be noted that the term "behavioral data" refers to data corresponding to a history of touch-based or motion-based interactions performed by the user on the mobile device that can be used to model user touch patterns.

Therefore, embodiments of the present invention provide a method, system, and computer program product for continuously verifying a user of a mobile device using touch-based behavioral embedding. The following described exemplary embodiments provide a system, method, and computer program product to, among other things, extracting user-specific interaction data from touch sensors on a mobile device, embedding the user-specific interaction data within feature vectors, and generating a model for user verification based on the embedded feature vectors that include user-specific interaction data from a user's history. Embodiments of the present disclosure, add a pre-process step (i.e., behavioral embedding) to traditional model building processes (i.e., data collection, feature extraction, model training and model testing) in which interaction data is embedded in a way such that it can be used to train a global classification model to verify specific users, including those users that have not necessarily been seen before. Once the embedded dataset is generated, any statistical, machine, or deep learning model can be trained as a binary classification model.

Thus, the present embodiments have the capacity to improve the technical field of cyber security by deriving a cost-efficient semi-global verification model for continuous user verification that preserves individual behavioral patterns associated with each user without training and maintaining user-based models. This may substantially reduce resource consumption and may facilitate model maintenance, evaluation, debugging, and monitoring. Additionally, the proposed verification model can work not only on users the model was trained on, but also on any user in the system (i.e., users on the training dataset or new users).

Figure 1:
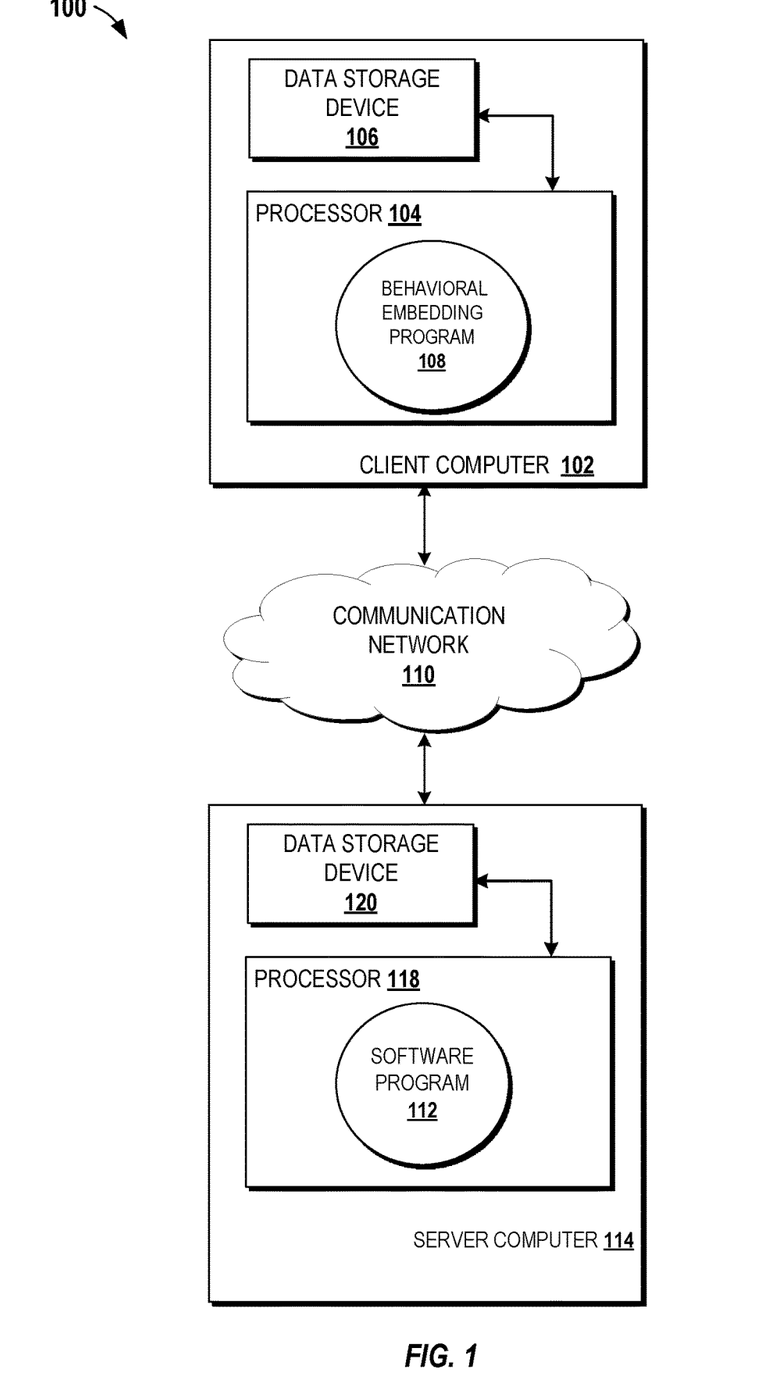
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104, that is enabled to run a behavioral embedding program 108, and a data storage device 106. Client computer 102 may be, for example, a mobile device, a smartphone, a personal digital assistant, a netbook, a laptop computer, a tablet computer, or any type of mobile computing device capable of accessing a network.

The networked computer environment 100 may also include a server computer 114 with a processor 118, that is enabled to run a software program 112, and a data storage device 120. In some embodiments, server computer 114 may be a resource management server, a web server, or any other electronic device capable of receiving and sending data via the communication network 110. In another embodiment, server computer 114 may represent a server computing system utilizing multiple computers as a server system, such as in a cloud computing environment. It should be noted that, in some embodiments, the behavioral embedding process performed by the behavioral embedding program 108 can be conducted on the server computer 114. In other embodiments, the behavioral embedding process performed by the behavioral embedding program 108 can be conducted on the client computer 102. It should also be noted that most (raw) data collection is conducted on the client computer 102.

The behavioral embedding program 108 running on client computer 102 may communicate with the software program 112 running on server computer 114 via the communication network 110. As will be discussed with reference to FIG. 4, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2A:
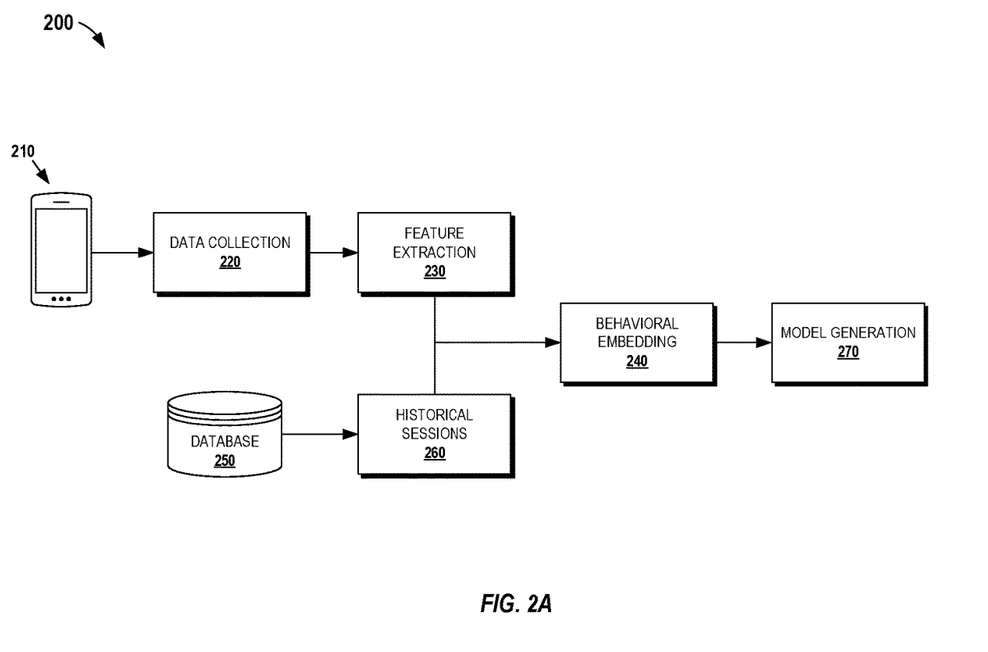
FIG. 2A depicts components of a behavioral embedding system for user verification in mobile devices, according to an embodiment of the present disclosure.

Referring now to FIG. 2A, components of a system 200 for user verification in mobile devices based on an interaction history are shown, according to an embodiment of the present disclosure. As depicted in the figure, the system 200 includes a data collection module 220, a feature extraction module 230, a database 250 storing historical sessions 260 associated with one or more users, a behavioral embedding module 240, and a model generation module 270.

According to an embodiment, the data collection module 220 collects data from a mobile device 210. The data collected by the data collection module 220 is associated with a user (not shown) of the mobile device 210. More specifically, the data collection module 220 extracts interaction data from touch sensors on the mobile device 210, the interaction data being associated with movements, gestures or touch events performed by the user during an interactive session with an application operating on the mobile device 210. In this embodiment, the touch events include, for example, a swipe or a press/push/click movement, performed by the user on the mobile device 210. For each recorded touch event the data collection module 220 extracts at least one of raw X, Y coordinates together with a timestamp, a size of a user's finger, and a pressure exerted by the user's finger on the mobile device 210.

It should be noted that data collection from the mobile device 210 is done with user consent via, for example, an opt-in and opt-out feature. Additionally, user(s) can choose to stop having his/her information being collected or used. In some embodiments, user(s) can be notified each time data is being collected. The collected data is envisioned to be secured and not shared with anyone without previous consent. For illustration purposes only, without intent of limitation only one mobile device 210 is shown in the figure. It may be understood that the system 200 may receive data from any number of mobile devices associated with one or more users.

After collecting user's touch interaction data from the mobile device 210, the feature extraction module 230 analyzes the collected interaction data and defines features to be extracted. In an embodiment, features to be extracted from the collected interaction data include, for example, a swipe direction, a gradient, a Euclidean distance, an average velocity, a maximum acceleration, a curvature, and similar features. It should be noted that extracted features are associated with a touch behavior of the user during the interactive session with the mobile device 210, and thus are unique to the user of the mobile device 210. According to an embodiment, for each touch event (e.g., swipe or press), the feature extraction module 230 builds a feature vector using methods well known in the art.

Subsequently, feature vectors are fed to the behavioral embedding module 240, in which an embedding layer is used to embed the user-specific features within the feature vectors and project the embedded features to a global feature space (i.e., a global dataset). According to an embodiment, the embedding process is conducted in two steps during the training phase:

In the first step, the behavioral embedding module 240 crosses each user session, with the user's own historical sessions 260. The behavioral embedding module 240 projects this data into a new global feature space with positive labels. More specifically, the behavioral embedding module 240 compares user's current session on the mobile device 210 against historical sessions 260 corresponding to the user for each extracted user-specific feature to create a user-specific dataset that can be used to train the model along with other users specific datasets or verify the specific user's identity.

In the second step, the behavioral embedding module 240 crosses data from each user session 260 with other (different) users sessions. This data is then projected to the new global feature space with negative labels that can be used to present anomalous activity. For each session, feature vectors can be extracted and transformed to the new global feature space using the current session compared to the historical sessions 260 associated with other (different) users.

According to an embodiment, to generate positive data for the global training set let user $u_j$ with n sessions in the application $[s_1, s_2, \ldots, s_n]$, $s_j \in R^D$, where D is the feature vector dimension and $[s_1, s_2, \ldots, s_n]$ are sorted by the date of creation. First, different sessions are crossed with all behavioral sessions of the history of the user. For example, $s_j$ is taken with respect to $[s_1, s_2, \ldots, s_{j-1}]$ and statistical features are calculated on $s_j$ with respect to the historical sessions 260. Statistical features include, for example, converting features of $s_j$ to percentile with respect to historical values in $[s_1, s_2, \ldots, s_{j-1}]$. In some embodiments, additional aggregative features may or may not be calculated in addition to statistical features, such as mean, variance, etc.

Similarly, the behavioral embedding module 240 generates negative data for the global training set. Specifically, given an X set of users, for each user $x_i$ in X, K random subset of users are selected ($|K|<|X|$), and for each other user $x_m$ in K, the steps described above for building negative data are applied with sessions from user $x_i$ acting as impostor sessions and the historical session 260 being the sessions corresponding to the other user $x_m$. This process produces K impostors feature vectors for each user in X, and in total $|X|*|K|$ negative feature vectors. By performing the above steps, user-specific data can be embedded within the feature vectors generated by the feature extraction module 230.

Figure 2B:
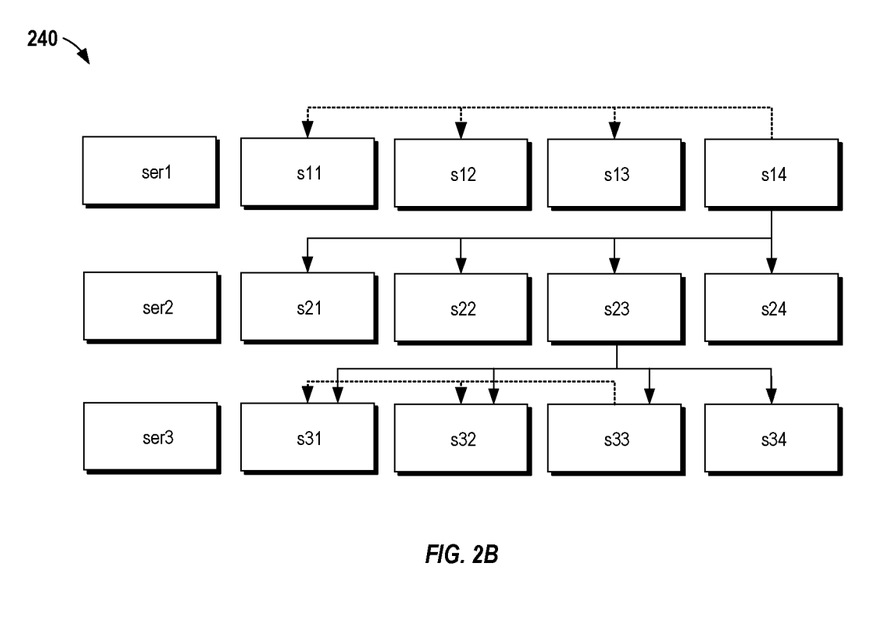
FIG. 2B depicts transforming user's touch data into an embedded dataset for training a global verification model, according to an embodiment of the present disclosure.

FIG. 2B illustrates the process of creating the datasets described above. In this figure, three different users are identified by the behavioral embedding module 240, each of the three different users (user1, user2, and user3) are associated with four sessions. Two positive feature vectors (indicated by dashed arrow lines) are built, i.e., s14 is built with respect to its three previous feature vectors. s33 is built with respect to its two past feature vectors. Also, two negative sessions (indicated by continuous arrow lines), i.e., s14 from user1 is chosen to be the impostor session with respect to user2. s23 from user2 is chosen to be the second impostor session with respect to user3. Therefore, s14 and s23 are embedded within the statistical features (e.g., percentiles) calculated with respect to the other users data. It should be noted that any number of users can be used to create the datasets for behavioral embedding. For illustration purposes only, without intent of limitation, three users were selected in the described example.

The above embedding process allows user-specific interactive features to be embedded in the user history and used by the model generation module 270 to train a global model as a binary classification model. The global verification model may include, for example, a statistical model, a machine learning model, or a deep-learning model. According to an embodiment, the global verification model is capable of training itself to differentiate between user-to-same-user activity (benign) and user-to-other-user activity (impostor).

In some embodiments, the global verification model can be divided into a finite (small) number of models based on common user characteristics. For example, touch events can be divided into two categories: swipe events and click events. Since these two categories can have different feature distribution, the above steps can be applied to two different semi-global models, i.e., one global verification model for clicks and another global verification model for swipes. It should be noted that, in some embodiments, there may be differences between iOS and Android devices. Accordingly, in such embodiments, the above steps can be applied to create a global verification model for iOS devices and another global verification model for Android devices.

According to another embodiment, the global verification model can be divided into several models by using a clustering method. Specifically, users in the system can be clustered into k groups based on their behavior characteristics using a clustering technique (e.g., k-means, DBSCAN, etc.). After clustering the users into k clusters, k global models can be built, i.e., one global model for each cluster of users in the system. In this embodiment, for example, a total of k semi-global models can be used for the entire dataset. However, even with the splits, the number of models stays fixed and much lower than the number of users. The semi-global models may include any statistical, machine, or deep learning model including random forest, gradient boosting, SVM, and the like.

Accordingly, in this embodiment, after embedding the behavioral data and training each of the semi-global models, the trained semi-global models can be used as follows: 1) as the user enters the application, the data collection module 220 starts collecting interaction data. This data is sent to the semi-global model (or the relevant semi-global model if there are multiple) together with the user's historical data (i.e., historical sessions 260) that is preserved in the database 250. Raw data can then be passed through the feature extraction module 230 and the behavioral embedding module 240. The last pre-process stage is to calculate statistical features on a current session with respect to the user historical sessions 260. The output of this process can be a feature vector that is fed to the trained semi-global model. The semi-global model produce a score or a prediction that correlate with probability of the tested data being benign or impostor which allows the service provider either to limit or ban the user.

Figure 3:
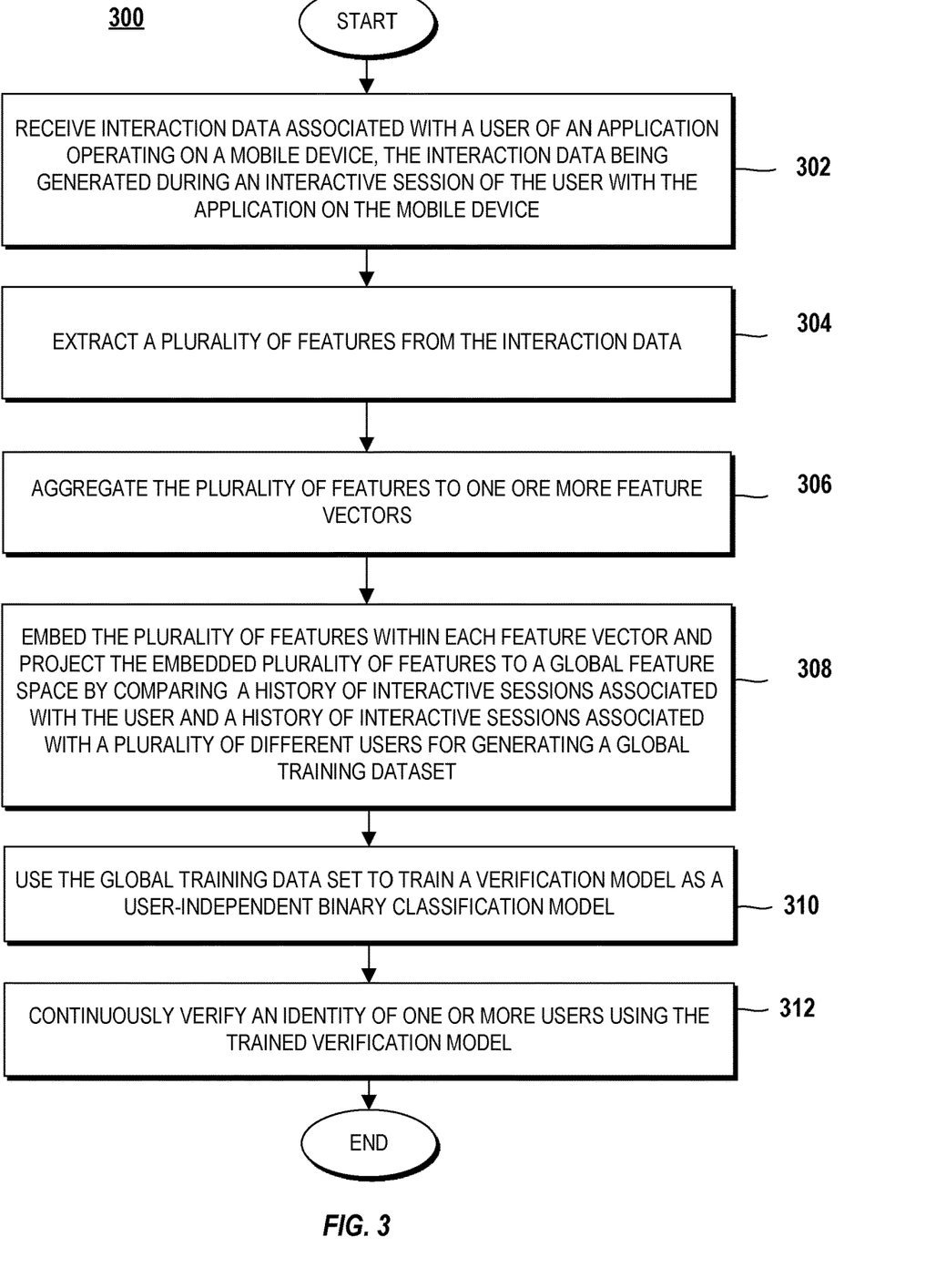
FIG. 3 depicts a flowchart illustrating the steps of a computer-implemented method for user verification using behavioral embedding, according to an embodiment of the present disclosure.

Referring now to FIG. 3, a flowchart 300 illustrating the steps of a computer-implemented method for behavioral embedding is shown, according to an embodiment of the present disclosure.

The method starts at step 302 by receiving interaction data associated with a user of an application operating on a mobile device, such as the mobile device 210 of FIG. 2A. The interaction data is generated during an interactive session of the user with the application on the mobile device. According to an embodiment, the interaction data includes a plurality of touch events corresponding to a swipe or press movement performed by the user on the mobile device. For each of the plurality of touch events, at least one of raw X, Y coordinates together with a timestamp, a size of a user's finger, and a pressure exerted by the user's finger on the mobile device are extracted.

At step 304, a plurality of features are extracted from the interaction data. According to an embodiment, exemplary features in the plurality of features extracted from the interaction data includes a swipe direction, a gradient, an Euclidean distance, an average velocity, a maximum acceleration, and a curvature. At step 306 one or more feature vectors are generated and the plurality of features are aggregated to the one or more feature vectors.

The method continues at step 308 by embedding the plurality of features within each feature vector and projecting the embedded plurality of features to a global feature space by comparing a history of interactive sessions associated with the user and a history of interactive sessions associated with a plurality of different users for generating a global training dataset. As explained above with reference to FIG. 2A, in a first step, the behavioral embedding process includes comparing the interaction data associated with the interactive session of the user against a database of historical sessions associated with the user, and projecting the interaction data associated with the interactive session of the user into the global feature space with positive labels. In a second step, the behavioral embedding process includes comparing the interaction data associated with the interactive session of the user against a database of historical sessions associated with the plurality of different users, and projecting data from each interactive session associated with the user together with the database of historical sessions associated with the plurality of different users into the global feature space with negative labels. In some embodiments, additional aggregative calculations can be performed on the global feature space to generate a transformed feature space.

At step 310 the generated global training dataset is used to generate a verification model as a global (user-independent) binary classification model. Finally, at step 312, the identity of one or more users of the application can be continuously verified using the trained verification model.

In some embodiments, the verification model can be divided into a finite number of models based on additional system related characteristics. Exemplary system related characteristics that can be used to split the verification model include a common behavioral biometric feature, an operating system, a screen dpi, a screen height, etc. In general, any metadata can be used to divide the verification system. In other embodiments, the verification model can be divided into a plurality of verification models by clustering a plurality of users into k clusters based on behavior characteristics using a clustering technique, and building a verification model for each of the k clusters. In another embodiment it can be split based on device type (e.g. iOS/Android or press/swipe).

Therefore, the proposed embodiments provide a method, system, and computer program product for embedding user-specific data derived from touch events within feature vectors that can be used to train a verification model. The verification model is built as a oneclass/binary/multiclass classification model adaptable to large-scale real time systems and capable of supporting millions of users each day, while preserving individual user behaviors and characteristics. Moreover, the proposed embodiments introduce an embedding layer that can be integrated into existing learning pipelines for embedding user-based data into global datasets, which can then be used to build global models for mobile continuous verification using behavioral biometrics data. A global model is built based on the projected data that can verify the identity of many users from within and without the data.

Figure 4:
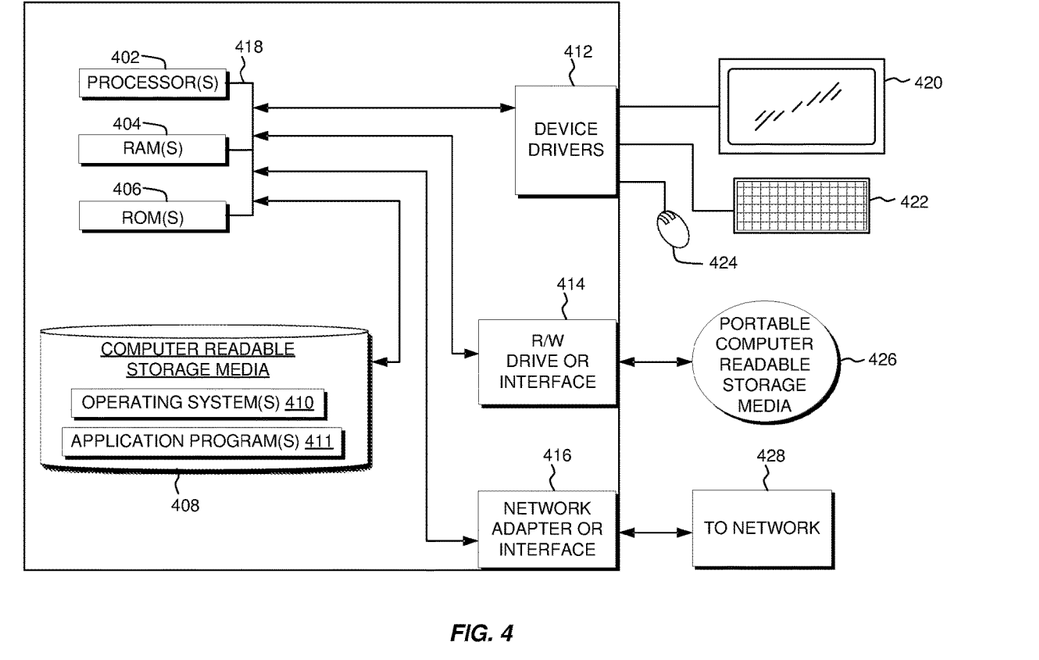
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
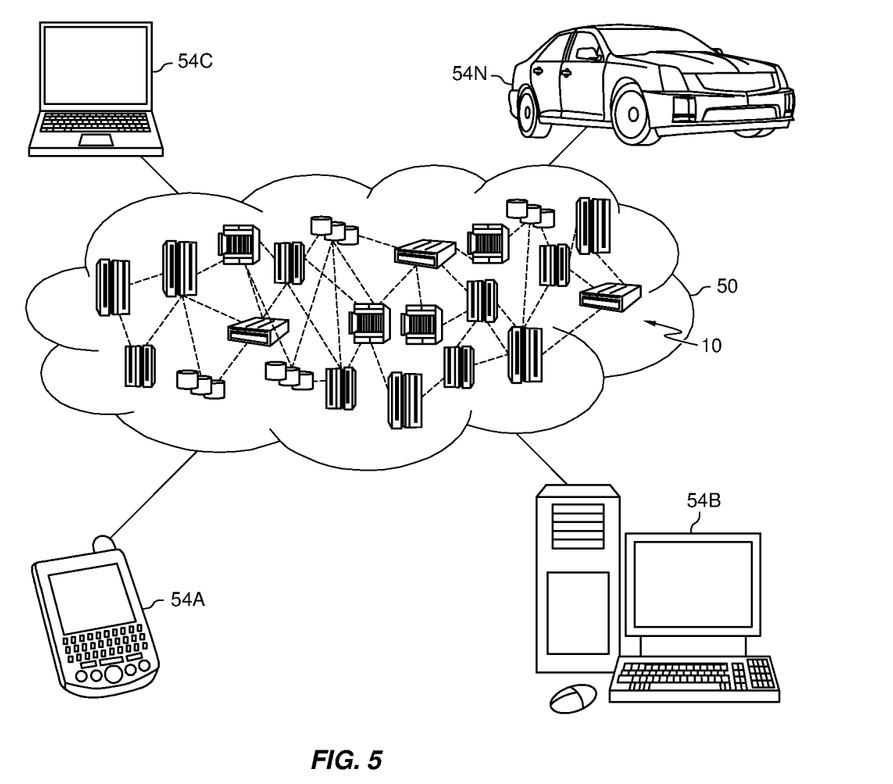
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
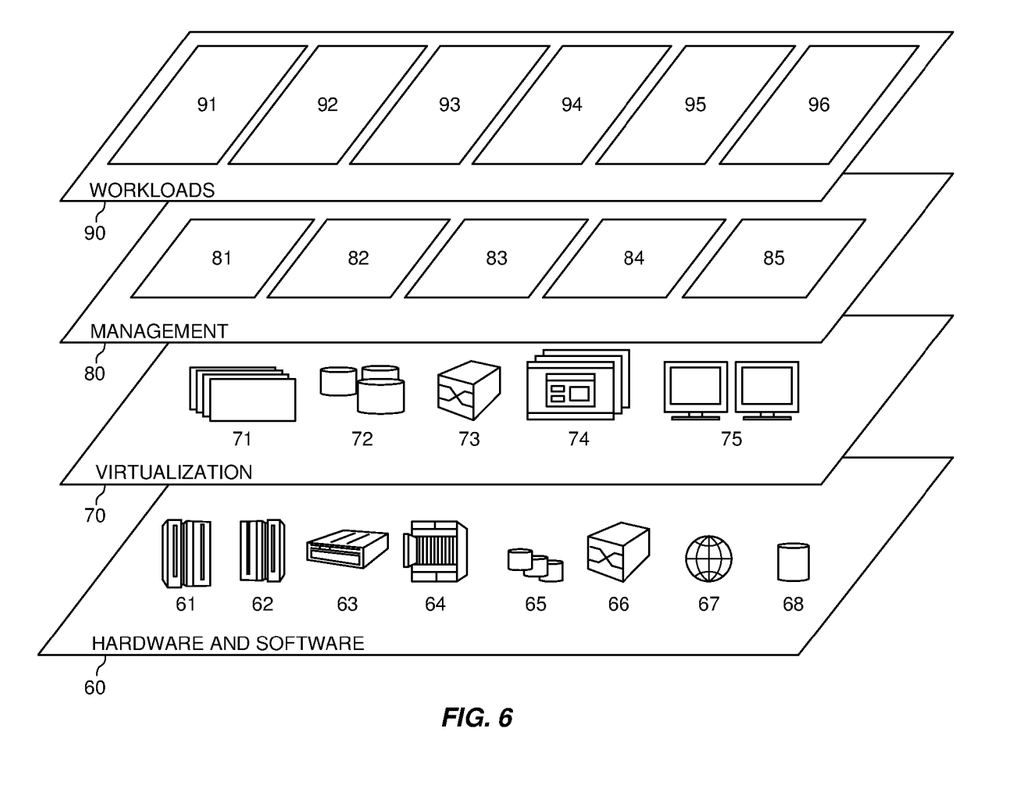
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for user verification using behavioral embedding 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for user verification, comprising:
    receiving, by one or more processors, interaction data associated with a user of an application operating on a mobile device, the interaction data being generated during an interactive session of the user with the application on the mobile device;

extracting, by the one or more processors, a plurality of features from the interaction data;

generating, by the one or more processors, one or more feature vectors;

aggregating, by the one or more processors, the plurality of features of the one or more feature vectors;

embedding, by the one or more processors, the plurality of features within each feature vector and projecting the embedded plurality of features within each feature vector to a global feature space by comparing a history of interactive sessions associated with the user and a history of interactive sessions associated with a plurality of different users for generating a global training dataset; and generating, by the one or more processors, a verification model as a global binary classification model using the global training dataset.

2. The computer-implemented method of claim 1, further comprising:

continuously verifying, by the one or more processors, an identity of one or more users using the verification model.

3. The computer-implemented method of claim 1, wherein embedding the plurality of features within each feature vector further comprises:

comparing, by the one or more processors, the interaction data associated with the interactive session of the user against a database of historical interactive sessions associated with the user; and projecting, by the one or more processors, the interaction data associated with the interactive session of the user into the global feature space with positive labels.

4. The computer-implemented method of claim 3, further comprising:

comparing, by the one or more processors, the interaction data associated with the interactive session of the user against a database of historical interactive sessions associated with the plurality of different users; and projecting, by the one or more processors, data from each interactive session associated with the user together with the database of historical sessions associated with the plurality of different users into the global feature space with negative labels, wherein additional aggregative calculations can be performed on the global feature space to generate a transformed feature space.

5. The computer-implemented method of claim 1, wherein the interaction data comprises a plurality of touch events including at least one of a swipe movement and a press movement performed by the user on the mobile device.

6. The computer-implemented method of claim 5, further comprising:

for each of the plurality of touch events, extracting, by the one or more processors, at least one of raw X, Y coordinates together with a timestamp, a size of a user's finger, and a pressure exerted by the user's finger on the mobile device.

7. The computer-implemented method of claim 1, wherein the plurality of features extracted from the interaction data comprises: a swipe direction, a gradient, an Euclidean distance, an average velocity, a maximum acceleration, and a curvature.

8. The computer-implemented method of claim 1, further comprising:

dividing, by the one or more processors, the verification model into a finite number of models based on additional system related characteristics.

9. The computer-implemented method of claim 1, further comprising:

dividing, by the one or more processors, the verification model into a plurality of semi-global verification models by:

clustering a plurality of users into k clusters based on behavior characteristics using a clustering technique; and building a semi-global verification model for each of the k clusters.

10. A computer system for user verification, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving, by one or more processors, interaction data associated with a user of an application operating on a mobile device, the interaction data being generated during an interactive session of the user with the application on the mobile device;

extracting, by the one or more processors, a plurality of features from the interaction data;

generating, by the one or more processors, one or more feature vectors;

aggregating, by the one or more processors, the plurality of features of the one or more feature vectors;

embedding, by the one or more processors, the plurality of features within each feature vector and projecting the embedded plurality of features within each feature vector to a global feature space by comparing a history of interactive sessions associated with the user and a history of interactive sessions associated with a plurality of different users for generating a global training dataset; and generating, by the one or more processors, a verification model as a global binary classification model using the global training dataset.

11. The computer system of claim 10, further comprising:

continuously verifying, by the one or more processors, an identity of one or more users using the trained verification model.

12. The computer system of claim 10, wherein embedding the plurality of features within each feature vector further comprises:

comparing, by the one or more processors, the interaction data associated with the interactive session of the user against a database of historical interactive sessions associated with the user; and projecting, by the one or more processors, the interaction data associated with the interactive session of the user into the global feature space with positive labels.

13. The computer system of claim 12, further comprising:

comparing, by the one or more processors, the interaction data associated with the interactive session of the user against a database of historical interactive sessions associated with the plurality of different users; and projecting, by the one or more processors, data from each interactive session associated with the user together with the database of historical sessions associated with the plurality of different users into the global feature space with negative labels, wherein additional aggregative calculations can be performed on the global feature space to generate a transformed feature space.

14. The computer system of claim 10, wherein the interaction data comprises a plurality of touch events including at least one of a swipe movement and a press movement performed by the user on the mobile device.

15. The computer system of claim 14, further comprising:
for each of the plurality of touch events, extracting, by the one or more processors, at least one of raw X, Y coordinates together with a timestamp, a size of a user's finger, and a pressure exerted by the user's finger on the mobile device.

16. The computer system of claim 10, wherein the plurality of features extracted from the interaction data comprises: a swipe direction, a gradient, an Euclidean distance, an average velocity, a maximum acceleration, and a curvature.

17. The computer system of claim 10, further comprising:
dividing, by the one or more processors, the verification model into a finite number of models based on additional system related characteristics.

18. The computer system of claim 10, further comprising:
dividing, by the one or more processors, the verification model into a plurality of semi-global verification models by:
clustering a plurality of users into k clusters based on behavior characteristics using a clustering technique; and
building a semi-global verification model for each of the k clusters.

19. A computer program product for user verification, comprising:
one or more computer readable storage media, and program instructions collectively stored on the one or more computer readable storage media, the program instructions comprising:
program instructions to receive, by one or more processors, interaction data associated with a user of an application operating on a mobile device, the interaction data being generated during an interactive session of the user with the application on the mobile device;
program instructions to extract, by the one or more processors, a plurality of features from the interaction data;
program instructions to generate, by the one or more processors, one or more feature vectors;
program instructions to aggregate, by the one or more processors, the plurality of features of the one or more feature vectors;
program instructions to embed, by the one or more processors, the plurality of features within each feature vector and program instructions to project the embedded plurality of features within each feature vector to a global feature space by comparing a history of interactive sessions associated with the user and a history of interactive sessions associated with a plurality of different users for generating a global training dataset; and
program instructions to generate, by the one or more processors, a verification model as a global binary classification model using the global training dataset.

20. The computer program product of claim 19, further comprising:
program instructions to continuously verify, by the one or more processors, an identity of one or more users using the trained verification model.

* * * * *